(12) United States Patent
Baskfield

(10) Patent No.: US 11,083,189 B1
(45) Date of Patent: Aug. 10, 2021

(54) WATERFOWL DECOY WITH LIFELIKE FEEDING MOVEMENT

(71) Applicant: Tyler J. Baskfield, Denver, CO (US)

(72) Inventor: Tyler J. Baskfield, Denver, CO (US)

( * ) Notice: Subject to any disclaimer, the term of this patent is extended or adjusted under 35 U.S.C. 154(b) by 278 days.

(21) Appl. No.: 16/297,623

(22) Filed: Mar. 9, 2019

Related U.S. Application Data

(60) Provisional application No. 62/641,305, filed on Mar. 10, 2018.

(51) Int. Cl.
*A01M 31/06* (2006.01)

(52) U.S. Cl.
CPC .................... *A01M 31/06* (2013.01)

(58) Field of Classification Search
CPC ....... A01M 31/06; A01M 31/00; A63H 11/08; A63H 13/005
See application file for complete search history.

(56) References Cited

U.S. PATENT DOCUMENTS

| | | | |
|---|---|---|---|
| 1,468,979 A | 9/1923 | Sherman et al. | |
| 2,457,295 A | 12/1948 | Woodhead | |
| 2,591,554 A | 4/1952 | Kinney et al. | |
| 2,799,960 A * | 7/1957 | Riley | A01M 31/06 43/3 |
| 2,814,898 A | 12/1957 | Fluke et al. | |
| 2,903,812 A | 9/1959 | Lewis | |
| 3,434,234 A | 3/1969 | Watts et al. | |
| 3,927,485 A | 12/1975 | Thorsnes, Jr. | |
| 4,566,214 A | 1/1986 | McCrory et al. | |
| 5,588,898 A | 12/1996 | Ooba | |
| 5,930,936 A | 8/1999 | Parr et al. | |
| 6,088,944 A | 7/2000 | Jones | |
| 6,412,209 B1 | 7/2002 | Kapraly et al. | |
| 6,412,210 B1 | 7/2002 | Horrell | |
| 6,553,709 B1 | 4/2003 | Owen | |
| 6,643,971 B2 | 11/2003 | Daniels | |
| 6,845,586 B1 | 1/2005 | Brock, IV | |
| 7,322,144 B2 | 1/2008 | Brewer | |
| 7,634,867 B2 | 12/2009 | Bill | |
| 7,730,656 B2 | 6/2010 | Hulley | |
| 7,841,123 B2 | 11/2010 | Walker | |
| 8,997,394 B2 | 4/2015 | Baskfield et al. | |
| 9,253,974 B2 | 2/2016 | Baskfield et al. | |
| 2004/0010957 A1 | 1/2004 | Corbiere, Jr. | |
| 2008/0028664 A1 | 2/2008 | Anthony | |
| 2008/0155878 A1 | 7/2008 | Myers | |
| 2009/0151217 A1 | 6/2009 | Gregory | |
| 2014/0298706 A1 | 10/2014 | Turner | |

(Continued)

*Primary Examiner* — Timothy D Collins
*Assistant Examiner* — Brittany A Lowery
(74) *Attorney, Agent, or Firm* — Skaar Ulbrich Macari, P.A.

(57) ABSTRACT

A motorized decoy provides lifelike feeding motion by rotating or pivoting a decoy head in and out of water. The motor releasably couples to the decoy head such that the decoy head is rotated in the rearward direction when the motor is coupled to the decoy head and in the forward direction when the motor is decoupled. The motor decouples from the head when encountering a decoupling force above a preset threshold. The decoy body can bob in, and changes its orientation relative to, the water as the decoy head pivots. The decoy head can also pause under the surface of the water before rising up from the water.

20 Claims, 4 Drawing Sheets

(56) References Cited

U.S. PATENT DOCUMENTS

| | | | |
|---|---|---|---|
| 2015/0208640 A1* | 7/2015 | Marsh | A01M 31/06 43/3 |
| 2015/0208642 A1* | 7/2015 | Baskfield | A01M 31/06 43/3 |
| 2017/0071191 A1* | 3/2017 | Campbell | A01M 31/06 |
| 2017/0231218 A1* | 8/2017 | Turner | A01M 31/06 43/2 |

* cited by examiner

WATERFOWL DECOY WITH LIFELIKE FEEDING MOVEMENT

PRIORITY

This application claims the priority benefit of U.S. Provisional Application No. 62/641,305, filed on Mar. 10, 2018, which is hereby incorporated herein by reference in its entirety.

FIELD

The present invention relates generally to waterfowl decoys used for hunting and, more particularly, to waterfowl decoys that mimic real feeding behavior on the water.

BACKGROUND

Waterfowl hunting is a popular sport enjoyed by hundreds of thousands of individuals. The traditional style of waterfowl hunting is based on hunters attempting to lure waterfowl to fly within the effective range of the hunter's shotguns. The most common method for achieving this is for the hunter to place decoys resembling live waterfowl on the water in close proximity to the hunter's location.

One of the major problems experienced by waterfowl hunters is the lack of motion from traditional style static waterfowl hunting decoys. Live waterfowl are not attracted to decoys that are motionless on a smooth water surface. In fact, decoy spreads that have no movement can often spook wary waterfowl and hinder hunting success. Traditional decoys rely on wind for movement and waterfowl hunting often takes place on small impoundments or wetlands that need heavy winds to churn the surface of the water and move the decoys.

It is common knowledge among waterfowl hunters that motion decoys, those exhibiting some form of animation, are more likely to attract waterfowl than are traditional static decoys. For example, U.S. Pat. No. 6,553,709 discloses a duck decoy that includes a motorized head and a motorized tail propeller. The head motor turns a linkage that causes the head to bob vertically up and down. The propeller imparts propulsion and can cause splashing. While this motion decoy, like other similar examples, is an improvement over static decoys, the movement produced is not fully realistic of true waterfowl feeding behavior on the water.

As a result, there is a continuing need to provide for a waterfowl decoy, movement system and method that better mimics real feeding behavior on the water.

SUMMARY

The problems discussed above are addressed by providing a decoy apparatus, system and method possessing movement that mimics lifelike feeding behavior of waterfowl— e.g., a "dabbling" motion where waterfowl throw their head under water and propel their head downward by paddling with their feet in the water. The waterfowl's tail points up and remains above water. The dabbling motion creates ripples, waves and/or a disturbance in the water.

Certain embodiments of the present invention can emulate this dabbling motion by providing a decoy apparatus having a weighted head that is attached to the decoy, wherein the neck portion of the head acts like a lever. A motor rotates the head back (clockwise) toward the tail end of the decoy body. The motor can force the head to push back upon a device that will create forward biasing from the stored energy in the biasing device. This can take place when the head is at or around 90 degrees, but could also be provided at any position along the rotational travel of the head.

The motor continues to push against the biasing device (e.g., a rubber band, a spring, an elastic device, etc.) until the head (or neck portion of the head) physically is blocked by the back or other portion of the decoy body. When the head is blocked by the decoy body the motor decouples from or relinquishes its connection to the head, allowing the elastic or stored energy in the biasing device to send or propel the weighted head forward to the point that it will free fall. The elastic device (e.g., a spring or like device) can be included in a myriad of places on or in the decoy.

In other embodiments, the head can be stopped prior to reaching the decoy body, or before traveling past 90 degrees, with gravity propelling the head forward.

The weight of the head pulls the front of the decoy body downward and under the water, tipping the decoy body transverse to the surface of the water. This motion causes ripples and disturbance in the water's surface and can produce a splashing sound. The decoy body can pause in the transverse position momentarily. The motor continues to rotate backward (clockwise) and reengages or recouples the head the decoy and begins the backwards rotation of the head again.

A motor adapted to rotate in both a clockwise and counterclockwise direction could also be employed with the present invention. With such an embodiment, the motor could selectively engage or pick up the head using a magnet or like engagement feature to couple or decouple the head and neck from the motor.

Provided herein is a method of providing a motorized waterfowl decoy with a simulated lifelike waterfowl feeding behavior on a body of water. The decoy can comprise a decoy body and a decoy head that is provided to the decoy body such that the decoy head is rotatable in a longitudinal plane of the decoy body. A motor is coupled to the decoy head to rotate the head rearwardly of the decoy body. The decoy head is decoupled from the motor automatically when a decoupling force above a preset threshold is applied to the decoy head. The decoupled decoy head is rotated forwardly of the decoy body towards a surface of the body of water. The decoupled decoy head continues to rotate and extend below the surface of the body of water. The uncoupled decoy head is recoupled with the motor when the decoupled decoy head is extended below the surface of the body of water.

The body of the decoy can be tipped when the decoy head is extended below the surface of the body of water so that a tail portion of the body raises vertically above the water while a breast portion of the decoy body extends vertically below the water.

The decoupled decoy head can be paused below the surface of the body of water momentarily before the recoupling step occurs.

Ripples in the body of water can be generated by the decoy to impart motion to an adjacent static waterfowl decoy.

A weight can be provided to the decoy head.

The motor and a battery can be disposed within the decoy body.

A bias member can be compressed as the decoy head rotates rearwardly of the decoy body. The compressed bias member can propel the decoy head forwardly towards a surface of the body of water after the decoy head is decoupled from the motor. The bias member can be a spring or other resilient component.

The decoy head can be partially disposed within a channel defined in the decoy body that is open to a breast portion of the decoy body and extends rearwardly therefrom.

The motor can be remotely activated wirelessly. For example, a wireless remote can be operated by the user from shore when the decoy is deployed on the body of water.

Also provided is a motorized waterfowl decoy with a simulated lifelike waterfowl feeding behavior on a body of water. The decoy can comprise a decoy body, including a longitudinal channel defined in the body from a front surface of the decoy and extending in a rearward direction. A decoy head is rotationally disposed in the longitudinal channel. A motor is disposed in the body and is releasably coupleable to the decoy head. The motor is configured within the decoy body such that the decoy head is rotated in the rearward direction when the motor is coupled to the decoy head. The decoy head is coupled to the motor such that the motor decouples from the head when encountering a decoupling force above a preset threshold.

The head can be weighted such that a rearward portion of the decoy body rises above a surface of the body of water when the decoy head is decoupled from the motor and is extending vertically below a surface of the water. The weight of the decoy head can be sufficient to cause the decoy body to become vertically oriented in the body of water when the decoy head is in an inverted position.

The decoy head can be coupled to the motor such that the motor recouples to a decoupled head when the decoy head is extending vertically below a surface of the water. The decoy head can be coupled to the motor such that the decoy head pauses momentarily while extending vertically below a surface of the water.

A wireless receiver can be coupled to the motor such that the motor can be remotely activated and deactivated wirelessly.

A bias member can be coupled to the decoy head such that the bias member is compressed as the head is moved in the rearward direction. The bias member can be a spring or other resilient component.

Still further provided is a motorized waterfowl decoy with a simulated lifelike waterfowl feeding behavior on a body of water, including a decoy body, a decoy head rotationally provided to the decoy body, a motor provided to the decoy body such that the motor can rotate the decoy head towards a rear of the decoy body when coupled to the motor, and means for releasably coupling the decoy head to the motor. The decoy can further include bias means for propelling the decoy head in a forward direction when decoupled from the motor.

The above summary of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
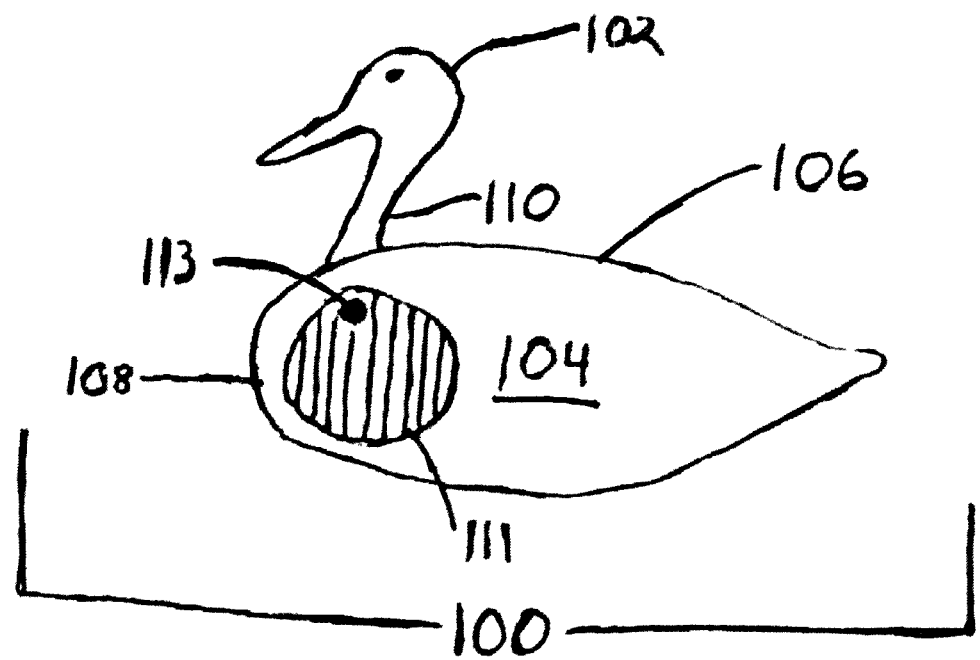
FIG. 1 is a side view of a decoy adapted to emulate lifelike feeding behavior of waterfowl, in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. It is understood that the features mentioned hereinbefore and those to be commented on hereinafter may be used not only in the specified combinations, but also in other combinations or in isolation, without departing from the scope of the present invention.

The decoy according to certain embodiments herein effectively mimics the feeding activities of dabbling ducks, Canada geese, and other waterfowl that forage for food beneath the water's surface. This movement, sometimes referred to as dabbling, includes the waterfowl tipping their bodies up in order to submerge their heads underwater. This is done so that they can forage the bottom of a wetland, submerged vegetation or aquatic life under the surface with their bill. Also, the motion of imitating a feeding waterfowl disturbs the surface of the water surrounding the decoy (e.g., causes ripples propagating outward), which imparts motion to other adjacent static waterfowl decoys.

Referring generally to FIGS. 1-6, a decoy device 100 is shown. The decoy 100 generally comprises a head portion 102 and a body portion 104. The decoy 100 can be sized, shaped, and colored to resemble a wide variety of waterfowl species, including both ducks and geese, according to various embodiments of the invention. The body 104 and head 102 can be formed from a variety of materials, including plastic, wood, foam, rubber, etc. Additional appendages such as wings and legs or feet can also be provided according to additional embodiments. The body 104 and head 102 can be colored using conventional means in order to best resemble the waterfowl of a given species and gender as may be desired by a given hunter.

Figure 2:
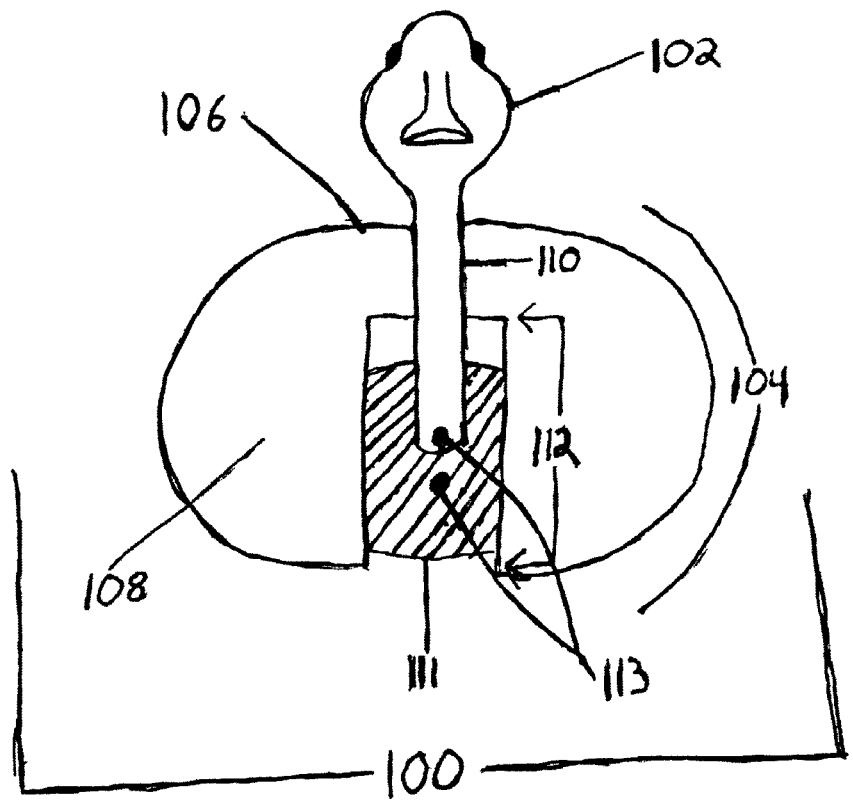
FIG. 2 is a front view of a decoy adapted to emulate lifelike feeding behavior of waterfowl, in accordance with embodiments of the present invention.
Figure 3:
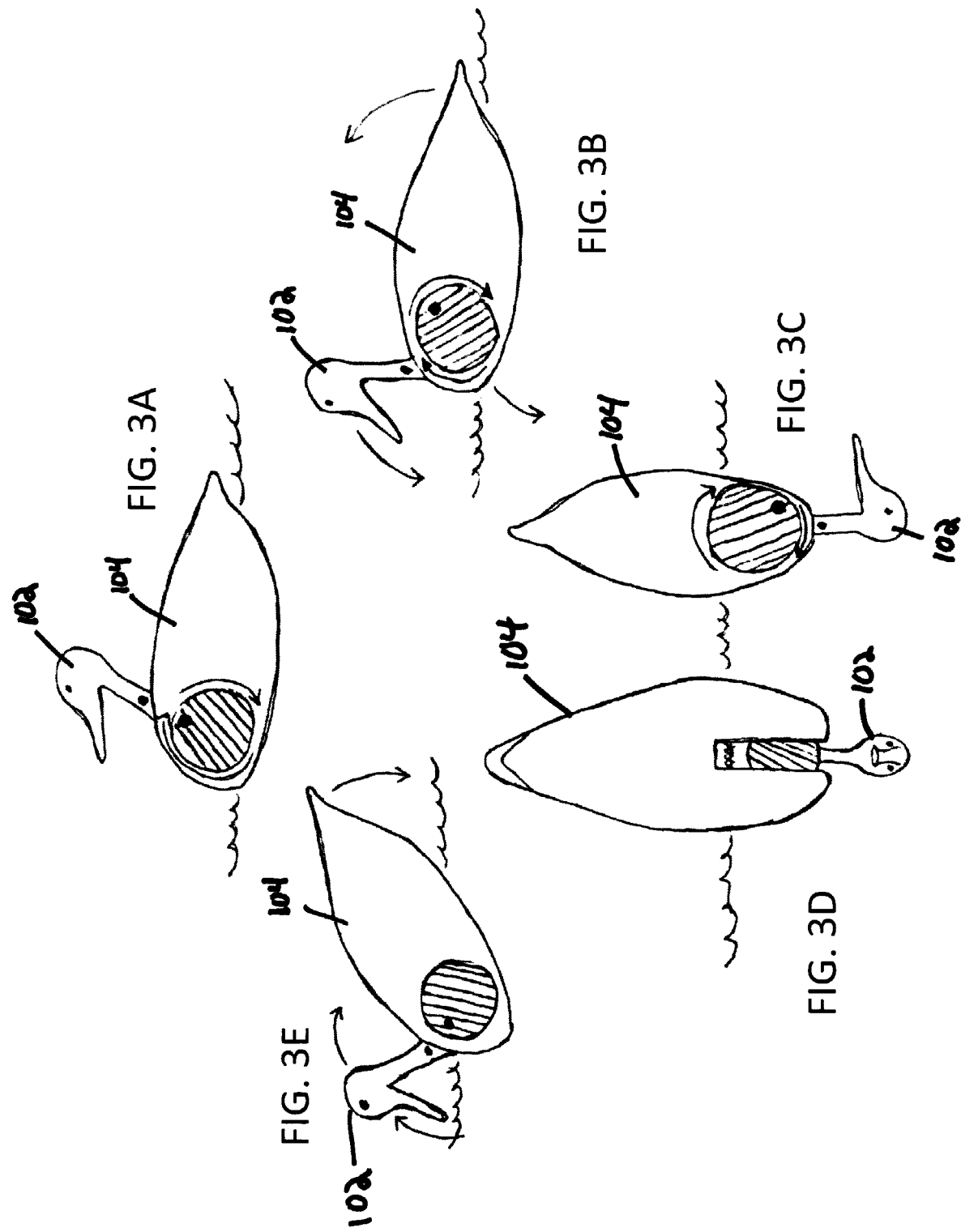
FIGS. 3A-3E illustrate the emulated feeding movement of a waterfowl decoy, in accordance with embodiments of the present invention.

Referring to FIGS. 1-2, the head 102 can comprise a central head portion, a bill portion extending forwardly therefrom, and a neck 110 extending downward from the central portion. A shank end portion of the neck 110 is operatively connected or coupled to a motor device 111, either directly or indirectly, that is disposed within the body portion 104 of the decoy 100.

The head 102 can include a weight element or like feature to further influence downward pivoting motion toward the water surface due to gravity.

The body 104 can comprise a back portion 106 and a forward or breast portion 108. The forward or breast portion 108 defines a center slot or channel 112 (FIG. 2) open to the front of the body 104 and extending rearwardly through a length of the body 104 sufficiently to provide clearance for the described pivoting motion of the head 102.

The body 104 can further include a recess or channel for receiving or housing the motor 111. Additionally, the body 104 can include recesses or areas configured to receive one or more batteries, mechanisms, and other elements employed to facilitate the head movement and simulation detailed herein. In general, the center of gravity of the decoy can be substantially forward (i.e., toward the breast portion 108) of the physical midline so that tipping or pivoting can easily be induced by pivoting movement of the head 102.

The motor 111 can be disposed inside of a motor housing and can include cam and shaft or rotor elements to facilitate the pivoting movement of the head 102. The motor 111 can be a gear motor, servo motor, or any other suitable type of electric, battery-powered motor.

The head 102 of the decoy 100 is propelled by the motor 111, which rotates the head 102 in a direction from the breast portion 108 backward toward the back of the decoy 100 until the back or the body of the decoy stops the weighted head 102. This movement disengages or decouples the head 102 from the motor using a decoupling mechanism 113 that facilitates detachment of the head 102 and neck 110 from the motor and its movement (which would allow gravity or a spring mechanism to then power the head 102 and neck 110), or the like.

The decoupling mechanism 113 can be magnets, a clutch, a cam or any other mechanism provided to the decoy 100 that facilitates the head to decouple from the drive motor and then be recoupled for subsequent cycles of the head's movement. The coupling and decoupling device 113 or portions thereof can be located in the body 104, throughout portions of the head, including the neck 110, and on or in the motor 111.

The feeding motion of the decoy 100 will now be described with reference to FIGS. 3A-3E. In FIG. 3A, the decoy 100 is shown in side view and the water's surface is indicated for reference. The head 102 is at the top point of its pivotal travel and stopped against the body 104 at the end of the center slot 112.

In this position, the head compresses a spring in the rear of the channel 112 or other biasing mechanism due to the rotational force of the motor as mentioned above. As a predetermined decoupling force value is reached, the motor 111 decouples from the head due to the decoupling mechanism 113.

After the motor 111 decouples from the head, the head is forced to pivot forward toward the water by the bias mechanism as indicated in FIG. 3B. The weight in the head furthers this movement by gravitational assist. The weighting of the decoy 100 forward of center further causes the front or breast side of the body 104 to also pivot downward into the water as indicated in FIG. 3B. The head 102 also acts as ballast to pivot the body such that the breast portion 108 extends below the water surface and the tail portion tips upward.

As shown in FIGS. 3C and 3D, the decoy pivots to the extent that the body assumes a vertical or near vertical orientation with respect to the horizontal plane of the water surface.

The shaft of the motor 111 continues to rotate throughout the entire cycle until the head 102 is re-engaged, recoupled or "picked up" by the motor via the coupling device 113. This can occur at a time where the body 104 is extending transversely from the water, such as for example, in the vertical orientation as shown in FIGS. 3C-3D. Thus, the pivotal movement of the decoy 100 can pause momentarily in this vertical orientation before the motor 111 recouples with the head and begins pivoting the head 102 upward to begin the movement again.

Next, the recoupled head 102 is pivoted upward as shown in FIG. 3E by the motor 111 such that the head 102 pivots back toward the release position indicated in FIG. 3A. As this occurs, the body 104 is moved back toward a horizontal orientation relative to the water surface as indicated in FIG. 3E.

The head 102 continues to rotate back toward the body 104 until reaching the decoupling point as explained with regard to FIG. 3A. A stop surface, device, magnet, clutch, latch, snap feature, lock, or like element can be provided to the body 104 and/or the head 102 to facilitate this stopping or decoupling feature.

The whole movement process or cycle repeats. The time that each cycle takes to complete can be adjusted by adjusting the rotation speed of the motor 111, the weight of the head 102 and the force of the biasing mechanism employed. A rheostat or other adjustment means can be coupled to the motor to allow the user to adjust the rotation speed. The weight of the head 102 can be adjusted to alter how quickly (and deep) the head 102 will dip under the water. More weight will cause a quicker dip motion. Weight also can be adjusted to alter the depth of the decoy submersion during tipping of the body 104. More weight will cause a deeper submersion.

It is noted that the same simulated feeding motion can be achieved with embodiments of the decoy 100 wherein the head 102 is decoupled and propelled forward towards the water surface from other rotational positions relative to the body within a possible 360-degree rotation of the head 102. This can be accomplished by providing a sufficiently-powerful biasing mechanism and setting the decoupling force accordingly. The biasing means can also be a tension device, such as a spring provided to the opposite side of the head 102 so that the propelled movement mentioned herein is imparted. Multiple biasing mechanism can also be employed simultaneously. The neck portion 110 of the head 102 can also be a cantilevered spring bias member.

In a further embodiment, no biasing mechanism is employed. In such embodiment, a hard stop is provided to the body to impart the decoupling force on the weighted head to cause the decoupling force described herein. Gravitational force acting on the weighted head then causes the forward pivoting motion described herein.

Figure 4:
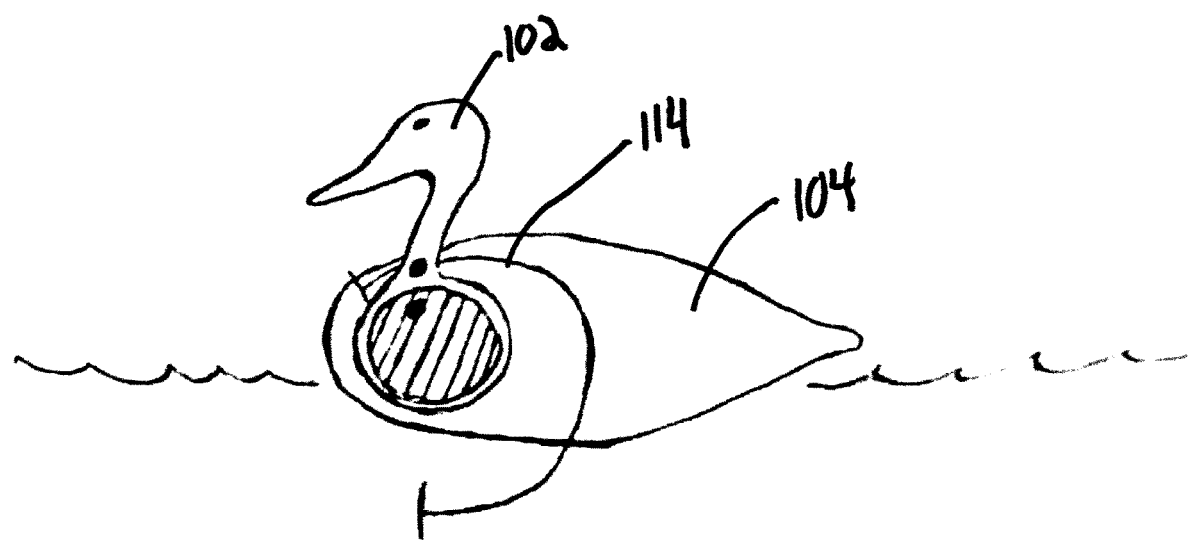
FIG. 4 is a side view of a waterfowl decoy having a spring or like elastic device, in accordance with embodiments of the present invention.

FIG. 4 depicts an embodiment of the decoy 100 that is shown to be split in half longitudinally down the center for purposes of explanation. This spring, elastic member or other biasing mechanism 114 is coupled to the head 102 to provide for energy to be stored that will propel the head 102 forward when the head 102 decouples from the motor 111. Again, in various embodiments, a spring or like biasing device 114 is not needed when the head 102 remains at or under 90 degrees from horizontal—e.g., gravity can cause the head 102 to fall. However, the spring or biasing mechanism 114 that stores the energy to propel the head 102 helps accelerate the head towards the water faster than gravity alone.

In operation, the motor 111 pushes the neck portion of head 102 against the biasing mechanism 114 until the head 102 exceeds a force threshold or when movement of the head is physically blocked (e.g., by hitting the back of the channel 112 or other portion of the body 104).

When the head 102 movement is blocked or stopped by the body 104, or the biasing force exceeds the decoupling threshold, the motor 111 relinquishes its connection to the head 102, allowing the biasing mechanism 114 to forcibly propel the head forward through the pinnacle of rotation to at least the point of free-fall.

Figure 5:
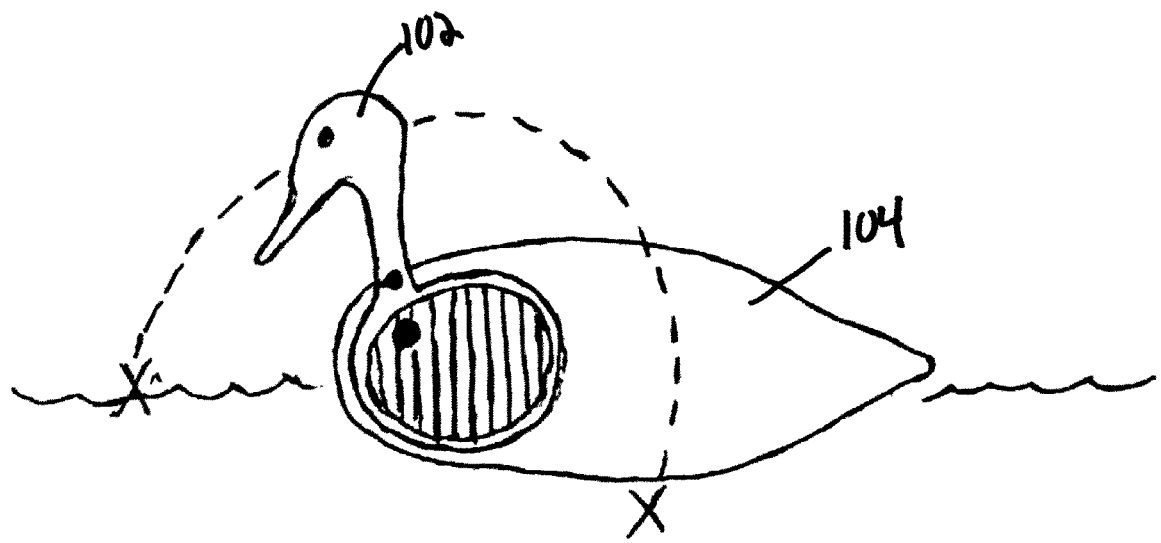
FIG. 5 illustrates a range of motion for an exemplary waterfowl decoy head, in accordance with embodiments of the present invention.

As shown in FIG. 5, the pivoting movement described herein can be achieved by configuring the head 102 for travel (while powered by the motor 111) anywhere from above the surface of the water to past the vertical plane and all the way to below the decoy 100.

Figure 6:
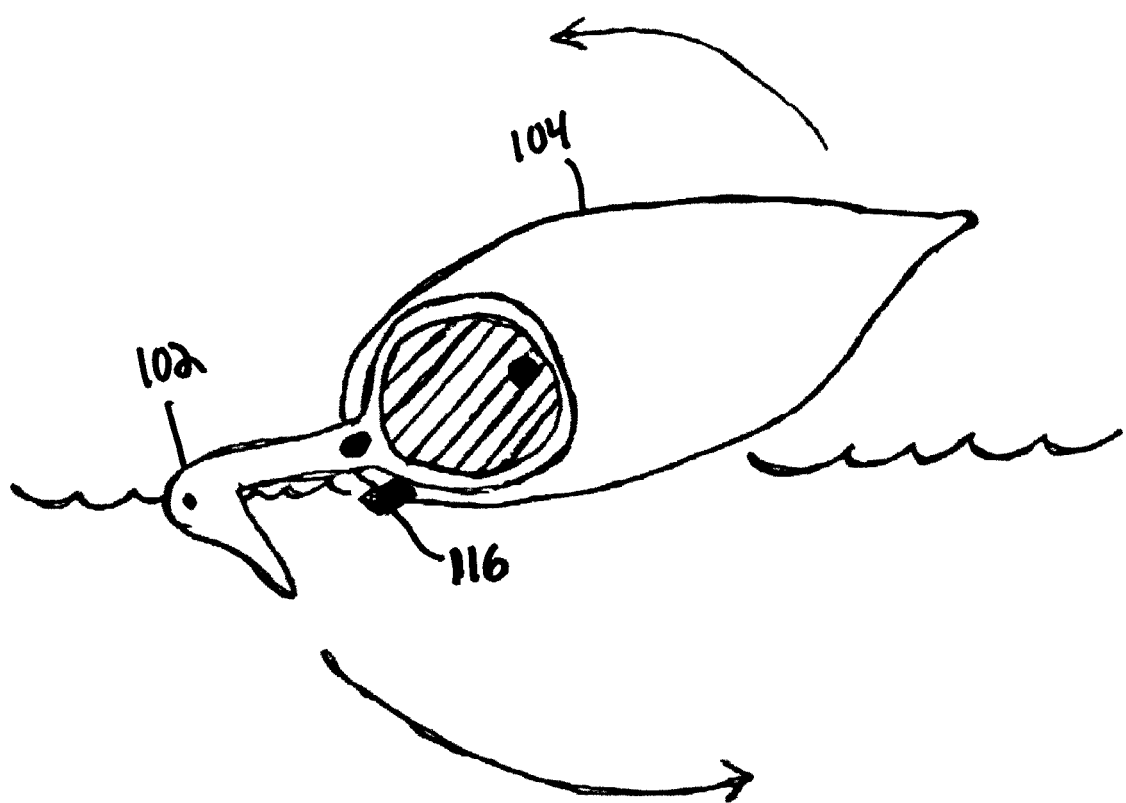
FIG. 6 illustrates a waterfowl decoy having a forward stop provided to a breast portion of the decoy, in accordance with embodiments of the present invention.

FIG. 6 shows an exemplary embodiment of the decoy 100 having a forward travel stop feature 116. The forward stop 116 can be provided in the front or lower breast of the body 104 to prevent the head 102 from rotating past the horizontal plane of the body 104 after the head 102 is propelled forward by the biasing mechanism 114 and/or by gravity. The forward stop 116 causes the motion of the decoy 100 to be more pronounced.

A wireless receiver can be provided to the body of the decoy and coupled to the motor. This allows the user to activate and deactivate the motor with a handheld wireless remote that communicates with the decoy via the wireless receiver. Thus, the user need not physically touch the decoy 100 to turn its motion on or off, which is both a safety and convenience benefit. Battery power can also be strategically managed. The motor speed can also be adjusted via the remote in further embodiments.

In use, the decoy apparatus, system and method achieve a realistic feeding motion by allowing the head to pivot towards the water in a manner mimicking the actual feeding motion of a waterfowl. This pivoting action causes the head to plunge beneath the water's surface, simultaneously causing the rear of the decoy to rotate or tilt to a vertical position as the head becomes a ballast for the decoy. The decoy will then bob in the water for a few seconds like a feeding waterfowl before the motor recouples with the head for the upward return movement. This combination of motions more closely resembles the actual motion made by a feeding duck, goose or other waterfowl species than is provided by conventional motorized decoys.

The movement of the decoy apparatus, method and system described herein is attractive to other waterfowl species because it indicates that there is feed in the impoundment and that there is safety due to the fact that there are already waterfowl using the impoundment or wetland. The repeated feeding cycles of the decoy also indicate a food source and safety for live waterfowl that see the movement of the decoy and the ripples on the water surface.

The decoy provided herein attracts other waterfowl visually in several ways: the flash of color from the decoy body when the quick movement is created from the weighted falling head, the ripples that are created on the surface of the water from the quick submerging head of the decoy and the resistance of the buoyant body of the decoy on the water's surface. The realistic motion of the decoy therefore sends several visual signals that attract flying ducks.

In another aspect, the decoy according to the invention includes a self-contained drive mechanism and power supply. It requires no attention or movement from hunters using the decoy other than deploying it at the beginning of their hunt. No poles or flotation devices are required.

In an additional embodiment, the motor 111 can be provided with a timer that will pause the decoy motion for a set time after a given number of head movement cycles.

The present invention may be embodied in other specific forms without departing from the spirit or essential attributes thereof, and it is, therefore, desired that the present embodiment be considered in all respects as illustrative and not restrictive. Those skilled in the art may recognize other equivalents to the specific embodiment described herein which equivalents are intended to be encompassed by the claims attached hereto.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of providing a motorized waterfowl decoy with a simulated lifelike waterfowl feeding behavior on a body of water, the decoy comprising a decoy body and a decoy head that is provided to the decoy body such that the decoy head is rotatable in a longitudinal plane of the decoy body, the method comprising:
    coupling a motor to the decoy head to rotate the head in the longitudinal plane in a first direction that is rearwardly of the decoy body;
    decoupling the decoy head from the motor automatically when a decoupling force above a preset threshold is applied to the decoy head;
    the decoupled decoy head rotating in a second direction that is opposite the first direction and is forwardly of the decoy body towards a surface of the body of water;
    the decoupled decoy head continuing to extend below the surface of the body of water; and
    recoupling the uncoupled decoy head with the motor when the decoupled decoy head is extended below the surface of the body of water to rotate the decoy head in the first direction.

2. The method of claim 1, further comprising: tipping the body of the decoy when the decoy head is extended below the surface of the body of water so that a tail portion of the body raises vertically above the water while a breast portion of the decoy body extends vertically below the water.

3. The method of claim 1, further comprising: pausing the decoupled decoy head below the surface of the body of water momentarily before the recoupling step occurs.

4. The method of claim 1, further comprising generating ripples in the body of water by the decoy to impart motion to an adjacent static waterfowl decoy.

5. The method of claim 1, further comprising providing a weight to the decoy head.

6. The method of claim 1, further comprising disposing the motor and a battery within the decoy body.

7. The method of claim 1, further comprising:
    compressing a bias member as the decoy head rotates rearwardly of the decoy body; and
    the compressed bias member propelling the decoy head forwardly towards a surface of the body of water after the decoy head is decoupled from the motor.

8. The method of claim 1, further comprising:
    compressing a spring as the decoy head rotates rearwardly of the decoy body; and the compressed spring propelling the decoy head forwardly towards a surface of the
body of water after the decoy head is decoupled from the motor.

9. The method of claim 1, wherein the decoy head is partially disposed within a channel defined in the decoy body that is open to a breast portion of the decoy body and extends rearwardly therefrom.

10. The method of claim 1, further comprising: remotely activating the motor wirelessly.

11. A motorized waterfowl decoy with a simulated lifelike waterfowl feeding behavior on a body of water, comprising:
a decoy body, including a longitudinal channel defined in the body from a front surface
of the decoy and extending in a rearward direction;
a decoy head rotationally disposed in the longitudinal channel; and
a motor disposed in the body and releasably coupleable to the decoy head, the motor
configured within the decoy body such that the decoy head is rotated by the motor in the longitudinal plane in a first direction that is rearwardly of the decoy body when the motor is coupled to the decoy head,
wherein the decoy head is coupled to the motor such that the motor decouples from the head when encountering a decoupling force above a preset threshold,
wherein, when the decoy head is decoupled from the motor, the decoy head rotates in
a second direction that is opposite the first direction that is forwardly of the decoy body towards a surface of the body of water and below the surface of the water, and
wherein, when the motor is extended below the surface of the water, the motor is recoupled to the decoy head to rotate the decoy head in the first direction.

12. The decoy of claim 11, wherein the head is weighted such that a rearward portion of the decoy body to rise above a surface of the body of water when the decoy head is decoupled from the motor and extends vertically below a surface of the water.

13. The decoy of claim 11, wherein the weight of the decoy head is sufficient to cause the decoy body to become vertically oriented in the body of water when the decoy head is in an inverted position.

14. The decoy of claim 11, wherein the decoy head is coupled to the motor such that the motor recouples to a decoupled head when the decoy head is extending vertically below a surface of the water.

15. The decoy of claim 11, wherein the decoy head is coupled to the motor such that the decoy head pauses momentarily while extending vertically below a surface of the water.

16. The decoy of claim 11, further comprising a wireless receiver coupled to the motor such that the motor can be remotely activated and deactivated wirelessly.

17. The decoy of claim 11, further comprising a bias member coupled to the decoy head such that the bias member is compressed as the head moves in the rearward direction.

18. The decoy of claim 11, further comprising a spring coupled to the decoy head such that the spring is compressed as the head moves in the rearward direction.

19. A motorized waterfowl decoy with a simulated lifelike waterfowl feeding behavior on a body of water, comprising:
a decoy body;
a decoy head rotationally disposed in decoy body such that the decoy head rotates in a
longitudinal plane of the decoy body;
a motor provided to the decoy body such that the motor can rotate the decoy head in a first direction in the longitudinal plane towards a rear of the decoy body when coupled to the motor; and
means for releasably coupling the decoy head to the motor,
wherein, when the decoy head is decoupled from the motor, the decoy head rotates in
a second direction that is opposite the first direction that is forwardly of the decoy body towards a surface of the body of water and below the surface of the water, and
wherein, when the decoy head is extended below the surface of the water, the motor is
recoupled with the decoy head such that the decoy head rotates in the first direction.

20. The decoy of claim 19, further comprising a bias means for propelling the decoy head in a forward direction when decoupled from the motor.

* * * * *